United States Patent [19]
Dankberg et al.

[11] Patent Number: 5,596,439
[45] Date of Patent: Jan. 21, 1997

[54] SELF-INTERFERENCE CANCELLATION FOR TWO-PARTY RELAYED COMMUNICATION

[75] Inventors: Mark D. Dankberg, Encinitas; Mark J. Miller, Vista, both of Calif.; Michael G. Mulligan, Westford, Mass.

[73] Assignee: ViaSat, Inc., Carlsbad, Calif.

[21] Appl. No.: 520,868

[22] Filed: Aug. 1, 1995

[51] Int. Cl.⁶ .................................................. H04B 10/00
[52] U.S. Cl. ...................... 359/161; 359/110; 359/111; 359/174; 370/201; 370/286; 455/295
[58] Field of Search ..................... 359/110–111, 143, 359/153, 161, 174–177; 455/295, 7, 24; 370/6, 32.1, 32; 375/211, 214; 379/410, 411

[56] References Cited

U.S. PATENT DOCUMENTS 4,701,935 10/1987 Namiki .................................. 375/214
4,995,104 2/1991 Gitlin ......................................... 370/6

*Primary Examiner*—Wellington Chin
*Assistant Examiner*—Kinfe-Michael Negash
*Attorney, Agent, or Firm*—Townsend and Townsend and Crew LLP; Kenneth R. Allen

[57] ABSTRACT

A source transmitted signal is cancelled at the receiver associated with the transmitter, so that the desired received signal can be extracted from a composite received signal, the composite received signal consisting of the source signal relayed from the relay station along with the desired received signal from the other user in the pair, plus additive noise. The invention takes advantage of the fact that each of the users knows a priori the exact structure of its source transmitted signal and can estimate the channel characteristics between the relay station and itself.

8 Claims, 4 Drawing Sheets

SELF-INTERFERENCE CANCELLATION FOR TWO-PARTY RELAYED COMMUNICATION

BACKGROUND OF THE INVENTION

The present invention relates to a radio frequency or optical communication system in which a relay station is used to aid communication between two parties, and more particularly to an improvement allowing more efficient use of the available channel resource.

Radio frequency or optical communication between two physically separate devices using a third party relay station is illustrated in FIG. 1. The relay station receives a signal from each of the two user devices and retransmits the composite received signal back to both of the users, typically on a frequency channel offset from the receiving frequency channel. Two examples are:

1. Satellite communication between two earth terminals (ground, airborne, or shipboard) using a non-processing "bent pipe" transponder in a linear mode.
2. Terrestrial line-of-sight radio communication between two terminals, using a relay radio to connect them (such as in a tethered aircraft or a radio tower).

The relay station may simultaneously retransmit many more signals than the two shown in FIG. 1. The relay resource is typically shared using any of the well known multiple access techniques such as Frequency Division Multiple Access (FDMA), Time Division Multiple Access (TDMA), Code Division Multiple Access (CDMA) or hybrids which use one or more of these techniques in combination. In each of these techniques, the relay resource is effectively channelized, so that the receiver can, by tuning in on a specific frequency, at a specific time, with a specific code, or some combination thereof, isolate a particular received signal from all the others. For simplicity, the following discussion will be based on the FDMA technique, although the apparatus may be used with TDMA, CDMA, or hybrid multiple access techniques.

FIG. 2 shows a pair of signals separated in the frequency domain between User 1 and User 2. The signal transmitted by User 1 has a center frequency of $f_1$ Hz and a bandwidth of $W_1$ Hz. The signal transmitted by User 2 has a center frequency of $f_2$ Hz and has a bandwidth of $W_2$ Hz. With the FDMA approach, the total bandwidth required to support simultaneous transmissions from the pair of users is ($W_1 + W_2$) Hz. The other signals being relayed are assigned to other non-overlapping bandwidths. Thus the number of users is limited by the bandwidth of the relay. Although this is a straightforward partitioning of the relay resource among a number of users, it is not necessarily the most efficient use.

In telephone communications, because of the limited bandwidth of the twisted-pair circuits, there is of necessity a more efficient use of the available bandwidth, in which the transmit and receive signals share the same bandwidth. However this type of communication is not relayed, in the sense of the word used herein, but rather it is point-to-point, although the signal may be routed through several intermediary nodes on its way from the source to the destination. Because the transmit and receive signals occupy the same bandwidth, devices known as hybrids are used to separate the combined signals on the two wires into the transmit and receive portions. However these devices, which are located at the two telephone company central offices, do not perfectly separate the signals, so an unwanted consequence is echoes. The received signal will thus contain two echoes of the transmitted signal, a near echo from the local central office, and a far echo from the remote central office.

For data communications, these echoes are removed by an echo canceller, which subtracts a properly scaled and delayed replica of the transmitted signal from the received signal. Because the signal is not relayed and there no frequency offset between the transmit and receive signals, the echo canceller can be implemented using an adaptive filter approach. The coefficients of the filter can be estimated using any one of a number of well-known algorithms such as the LMS (least-mean-square) algorithm. However, this approach cannot be extended to the case of a relayed communication system in which the transmitting and receiving frequencies are significantly different. Thus, a different cancellation technique must be employed in order for relayed signals to be able to share the same bandwidth.

What is needed is a mechanism to provide more efficient use of the available channel resource to support two-way relayed communication for any pair-wise connection among a group of radio frequency or optical terminals. More specifically, what is needed is an improvement which is independent of the multiple access technique in use, independent of the modulation and coding of the system and which is without the benefit of any data compression techniques or need for special equipment at the relay station.

SUMMARY OF THE INVENTION

According to the invention, a source-transmitted signal is cancelled at the receiver associated with the transmitter, so that the desired received signal can be extracted from a composite received signal, the composite received signal consisting of the source-transmitted signal relayed from the relay station along with the desired received signal from the other user in the pair, plus additive noise. The invention takes advantage of the fact that each of the users knows a priori the exact structure of its source-transmitted signal and can estimate the channel characteristics between the relay station and itself. The device at the origin of the source signal uses this knowledge to help estimate:

The roundtrip propagation delay to and from the relay station.

Relative signal amplitude, carrier frequency and phase of the relayed source signal vs. the a priori known source signal.

Once the device at the sending station has determined these parameters it can subtract a time-, frequency-, phase and amplitude-adjusted version of the known a priori transmitted signal from the composite relayed (downlink) signal from the relay station. The remaining signal consists of the desired signal from the other user, plus additive noise due to the communication channel, plus an error signal resulting from residual misalignment of time, phase, frequency, and amplitude.

The invention will become better understood upon review of the drawings and accompanying technical description.

DESCRIPTION OF SPECIFIC EMBODIMENTS

Figure 1:
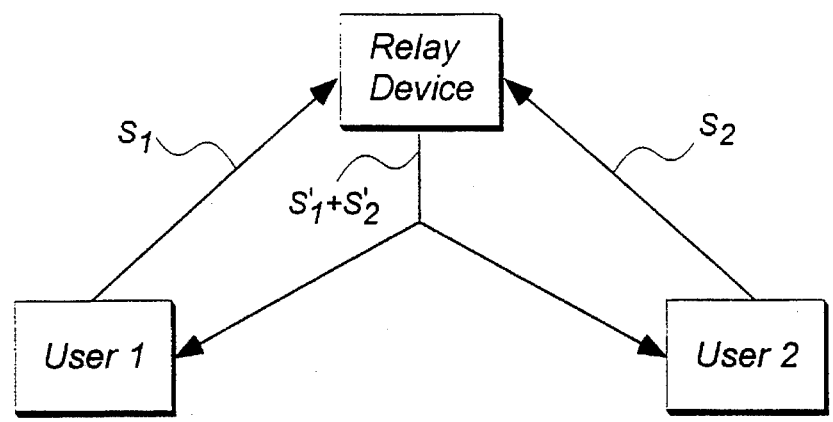
FIG. 1 is a diagram illustrating the operation of a relay communication system.
Figure 2:
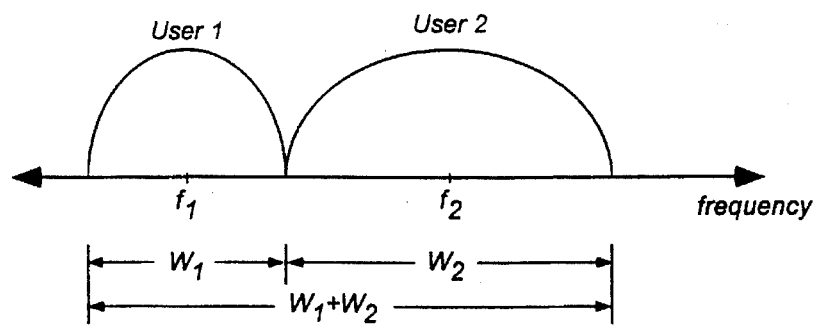
FIG. 2 is a diagram illustrating the required bandwidth for conventional full duplex communication.
Figure 3:
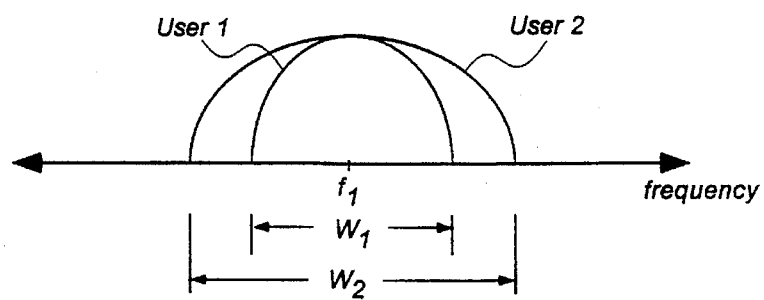
FIG. 3 is a diagram illustrating the required bandwidth for full duplex communication with the present invention.

FIG. 3 shows a benefit of the invention, namely, the increased utilization of available bandwidth by overlapping of signals. Using the invention, User 1 and User 2 can simultaneously transmit using the same center frequency, $f_1$ Hz. The resulting total bandwidth occupied by the pair of signals is only $W_1$ or $W_2$ Hz, whichever is greater, a savings of up to 50% compared to the $(W_1+W_2)$ Hz required without the invention, freeing bandwidth for other users. In a TDMA environment, User 1 and User 2 may share the same slot, freeing up other slots for more users. In a CDMA system, users may likewise share the same spreading code. The invention works because the device originating a signal has knowledge of the source signal and is able to estimate the channel characteristics.

Figure 4:
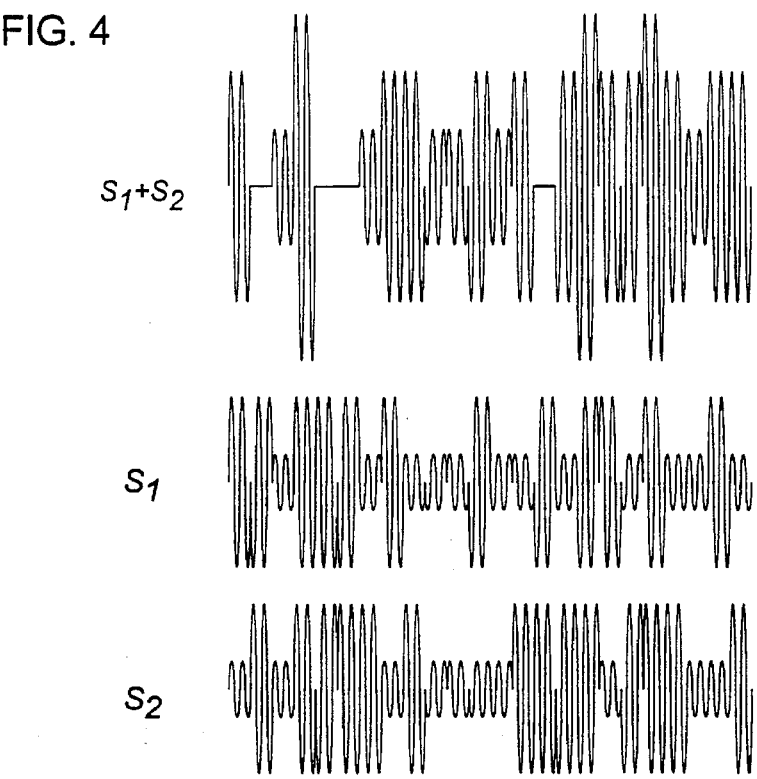
FIG. 4 is a waveform diagram for illustrating the self-interference cancellation technique.

The concept of combined signals is illustrated in FIG. 4. In trace 1, there is represented a combined signal S1+S2. Trace 2 shows first source signal S1. Trace 3 shows second source signal S2. The relay station always transmits combined signals. The first source signal can be subtracted from the combined signal to recover the second source signal, i.e., the signal from the other device. While the signal shown employs amplitude shift keying, other modulations can be used as well. In this example, it is observed that at various times the two source signals, S1 and S2, cancel one another, producing a zero level in the combined signal S1+S2. It is important to note that although the combined signal may be zero at times, subtracting out the first source signal S1 still recovers the second source signal S2, and therefore this phenomenon will not affect the operation of the current invention.

The invention may be implemented via digital signal processing hardware, firmware, or software. It may also be implemented largely in analog (linear) hardware. Recognizing that the invention can serve as an enhancement to existing communication equipment as illustrated by FIGS. 5 and 6, the choice of implementation for the invention will depend on the particular application.

Figure 5:
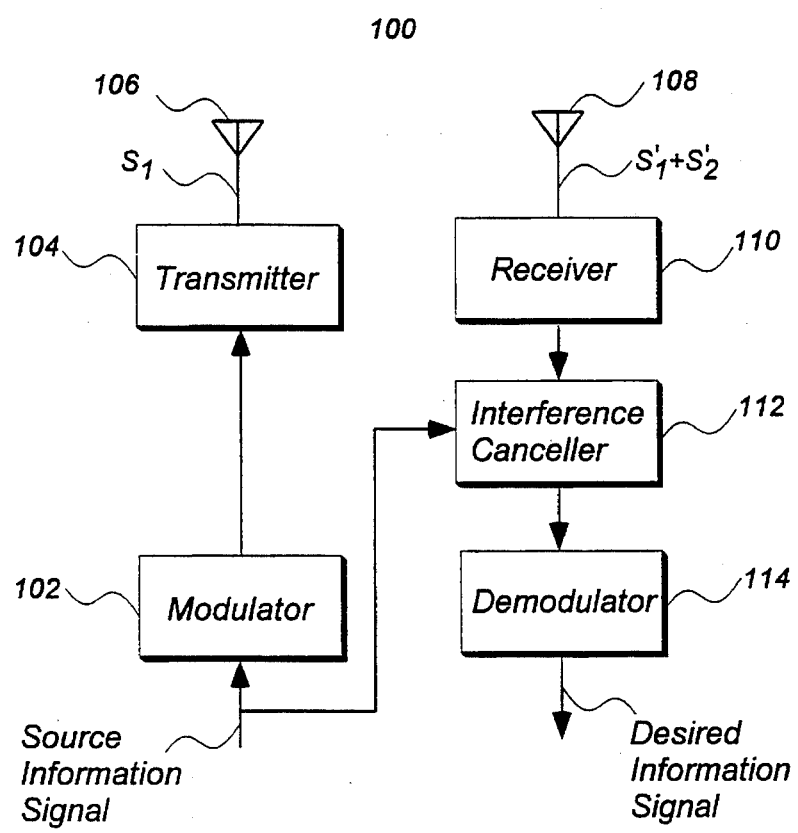
FIG. 5 is a block diagram showing the relationship of an interference canceller according to the present invention to the other components of the transmitter/receiver, for applications in which the source information signal is digital in nature.

FIG. 5 illustrates the configuration of a transmitter/receiver employing the current invention for an application in which the source information signal is digital in nature. In this case it is more efficient to delay, or store, the source information signal rather than the output of the modulator. Thus the representation of the source signal S1 that is used by the interference canceller is the source information signal. On the other hand, if the source information signal is analog in nature, the configuration of FIG. 6 may be preferable, in which the output of the modulator is the representation of the source signal used by the interference canceller. If the roundtrip transmission time to and from the relay device is sufficiently small, the choice of configuration becomes arbitrary.

Figure 6:
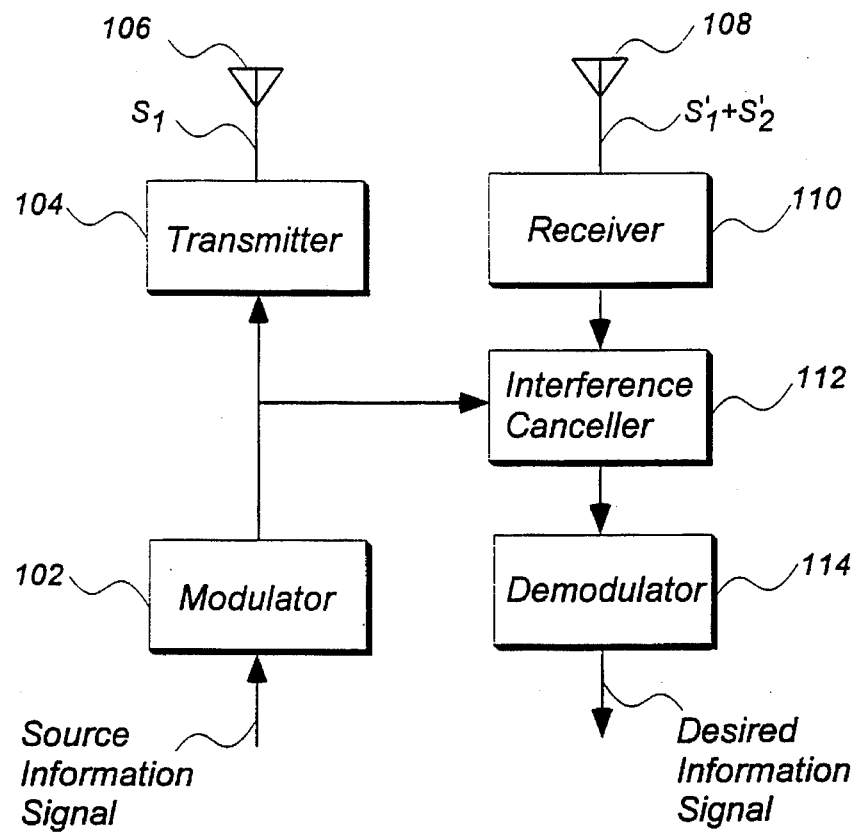
FIG. 6 is a block diagram showing the relationship of an interference canceller according to the present invention to the other components of the transmitter/receiver, for applications in which the source information signal is analog in nature.

Whether the configuration of FIG. 5 or that of FIG. 6 is employed, it should be clear that both of the communicating parties must use a transmitter/receiver employing the current invention. For simplicity, the operation will be described for the User 1 equipment only. Referring to FIG. 5, each device 100 has a modulator 102, a transmitter 104, a transmitting antenna 106 or equivalent signal radiator, a receiving antenna 108, a receiver 110, an interference canceller 112 and a demodulator 114. Alternatively, the user device could be configured with a single antenna and a diplexer in place of the transmitting antenna 106 and the receiving antenna 108. The modulator 102 converts the source information signal into a format suitable for transmission. The transmitter 104, through the transmitting antenna 106, directs a source signal S1 to the relay station. Through the receiving antenna 108, the receiver 110 receives the composite signal S1'+S2', and the interference canceller compares a signal representing the composite signal S1'+S2' and subtracts out a signal representing S1' based on an estimate of the channel transmission characteristics and prior knowledge of the signal representing S1, as contained in the source information signal, to obtain a signal representing S2'. The demodulator 114 recovers the desired information signal from the signal representing the recovered S2' signal. The configuration of FIG. 6 differs from the configuration of FIG. 5 just described only in that interference canceller obtains prior knowledge of the signal representing S1 from the output of the modulator 102, rather than from the source information signal.

Figure 7:
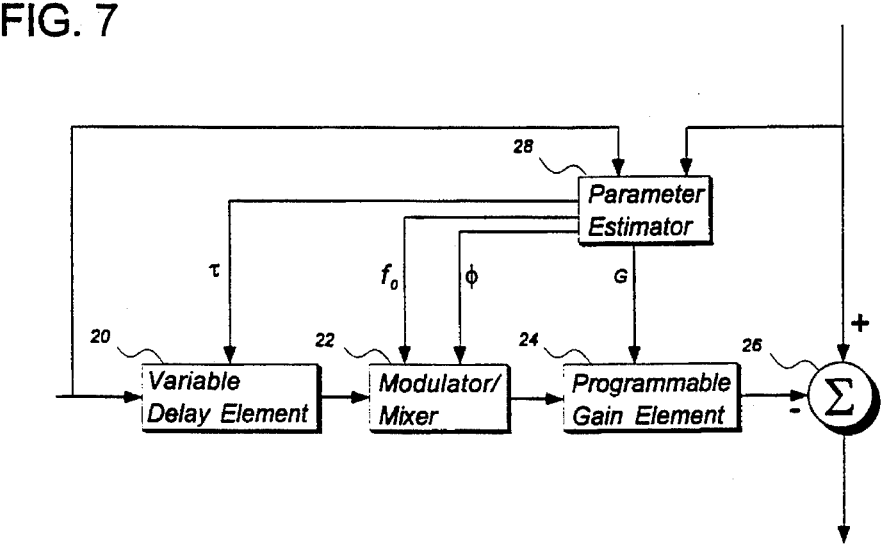
FIG. 7 is a block diagram of a specific embodiment of the present invention.

FIG. 7 illustrates an embodiment of the interference canceller 112. It has five elements: a variable delay element 20 for storing a representation of the source signal, a modulator/mixer element 22, a programmable gain element 24, a subtractor 26, and a parameter estimation element 28. The source signal which is transmitted as S1, or the source information signal used to produce S1, is provided through the variable delay element 20, then after delay, through the modulator/mixer element 22, and on to the programmable gain element 24 into the subtractor 26. The signal representing the received composite signal S1'+S2' is fed into both the parameter estimation element 28 and the subtractor 26. The parameter estimation element 28 is dynamically programmed to provide time, frequency, phase and gain correction to the variable delay element 20, the modulator/mixer 22, and the programmable gain element 24, respectively. The output of the subtractor 26 is the desired component of the received signal.

More specifically, the interference canceller 112 consists of the following major elements:

Variable delay element 20: This is used to delay the known source signal an amount of time $\tau$, so that it aligns correctly in time with the source signal component of the received composite signal.

Modulator/mixer element 22: This is used to adjust the frequency and phase of the known source signal so that it has the same frequency and phase of the source signal component of the received composite signal. The delayed known source signal component is multiplied by $e^{j(2\pi f_o t + \phi)}$ where $f_o$ is the estimated relative frequency difference between the known and received signals and $\phi_i$s the estimated relative phase difference. If the known source signal is stored in the delay element 20 in the form of the source information signal, then this element must also replicate the function of the modulator 106.

Programmable gain element 24: This is used to adjust the relative amplitude of the known source signal so that it is the same as the source signal component of the composite received signal.

Subtractor 26: This is used to linearly subtract the adjusted source signal from the composite received signal.

Parameter estimation element 28: This is used to derive the adjustment parameters, $\tau$, $f_o$, $\phi$ and G, each of which may be time varying, that are used to correctly align the source signal with the source signal component of the received composite signal.

Each of these components has one or more well known realizations. There are many possible implementations for the parameter estimation function and the invention does not depend on any one in particular. An example method for initially estimating the desired parameters is described below.

The relay channel is assumed to be linear, so the presence or absence of the other user's signal, S2, will not affect the reliability of the estimate of any of the four parameters (t, $f_o$, $\phi$ and G) needed to modify the stored representation of S1 to produce the cancellation signal. The parameters can be estimated using conventional open or closed loop estimation algorithms. For example, correlation techniques may be employed whether or not the other signal is present, the only difference being that if the other signal is present it appears as a large noise component to the correlator and thus the duration of the correlation must be increased.

Figure 8:
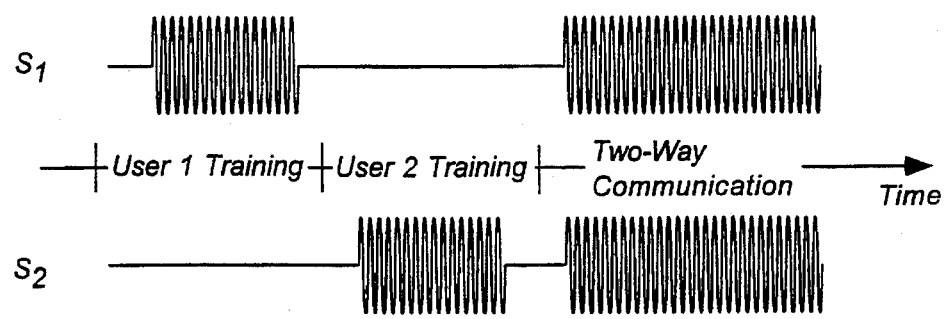
FIG. 8 is a waveform timing diagram illustrating one possible training sequence for use with the present invention.

If a quick initial estimate of the four parameters is required, a simple training protocol, as illustrated by FIG. 8, can be used. In this embodiment, by prior agreement, User 2 suppresses transmission of its signal at and for a predetermined period of time. During that time, User device 1 estimates its parameters. Then User device 1 suppresses its signal for a predetermined period of time while User device 2 estimates its parameters. Then both users can begin communication, using the estimated parameters to initialize the cancellation devices. Many different training protocols are possible with the present invention.

Figure 9:
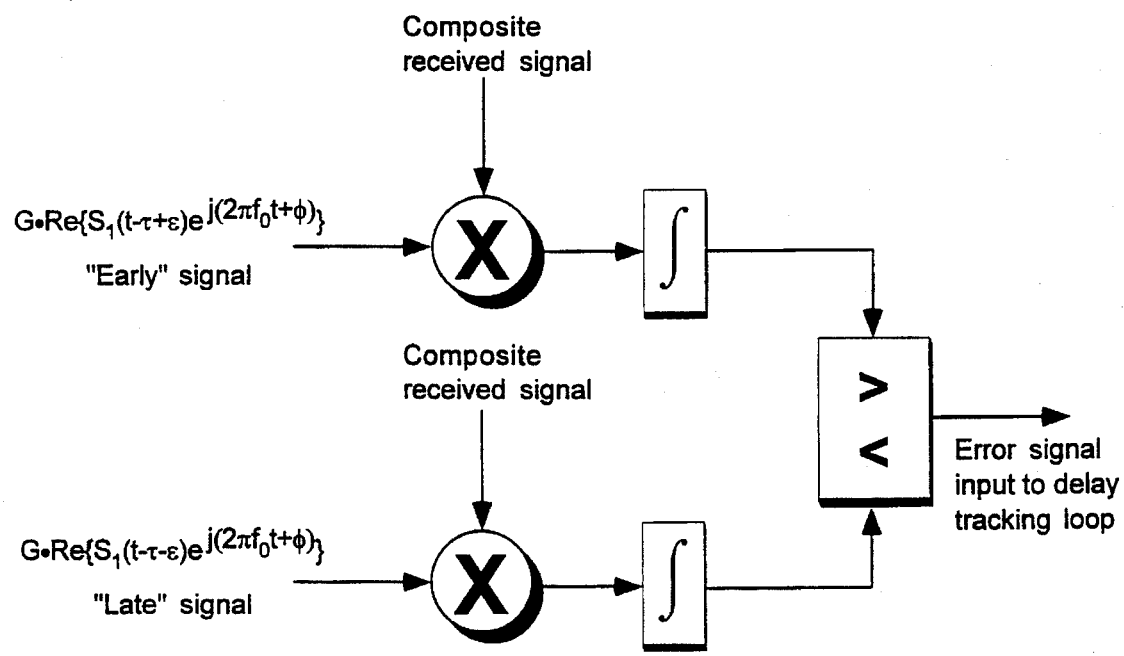
FIG. 9 is a block diagram illustrating one embodiment of the delay parameter estimator.

After the interference cancellation device parameters have been initialized, they must be frequently updated (tracked) to minimize the error signal component over the course of the two-way communication. A technique for generating an error signal to track the delay parameter is shown in FIG. 9. It uses an "early - late" gating technique to regularly determine whether a slightly smaller or slightly larger delay improves the correlation of the a priori known own signal with the received composite signal from the relay. The error signal is used as the input to a classic delay locked loop to maintain the best estimate of the delay parameter $\tau$. The carrier frequency and phase parameters can be tracked using a similar technique.

By way of summary, the invention comprises a method for two-way relayed electromagnetic communication, such as radio or optical, between a first device and a second device through a relay station, such as a satellite transponder or a terrestrial repeater, comprising the steps of generating at each device a source signal, storing a representation of the source signal, which may be either the source signal itself or the source information conveyed by the source signal, estimating channel characteristics of a roundtrip path to the relay station from the device to obtain compensation parameters, transmitting the source signal to the relay station where all signals are relayed, receiving at each device a composite signal from the relay station, where the composite signal contains a copy of the representation of the source signal from each transmitting device of the pair, modifying the stored representation using the compensation parameters to obtain a cancellation signal, and subtracting the cancellation signal from the composite signal to recover a desired signal, the desired signal being the source signal from the other device.

The method could be limited to use with transmission on a first common transmit frequency channel and reception on a second common receive frequency channel to optimize bandwidth utilization. The method could also be used in time division multiple access systems or code division multiple access systems, sharing time slots and spreading codes, respectively. Furthermore, the method could be used in any hybrid combination of these multiple access techniques (FDMA, TDMA, and CDMA).

An apparatus according to the invention is used in devices in a system for two-way relayed communication through a relay station, wherein each device includes a modulator, a transmitter, a receiver and a demodulator. The apparatus may comprise the combination of means for capturing either a source signal directed to the transmitter from the modulator or the source information signal, means for storing a representation of the source signal or source information signal, means for estimating channel characteristics of a roundtrip path to the relay station to obtain compensation parameters, means for extracting a composite signal from the receiver where the composite signal contains a copy of the source signal, means coupled to the estimator for modifying the stored signal using the compensation parameters to obtain a cancellation signal, and means coupled to the modifying means and to the extracting means for subtracting the cancellation signal from the composite signal to recover a desired signal, the desired signal being the source signal from the other device.

The invention has now been explained with reference to specific embodiments. Other embodiments will be apparent to those of ordinary skill in the art. It is therefore not intended that the invention be limited except as indicated by the appended claims.

What is claimed is:

1. A method for two-way relayed electromagnetic communication between a first device and a second device through a relay station comprising the steps of:

generating at each said first and second device a source signal;

storing a representation of said source signal as a stored signal at each said device at which said source signal originates;

estimating channel characteristics of a roundtrip path to said relay station to obtain compensation parameters for each said device;

transmitting said source signal from each said device to said relay station;

receiving at each said device a composite signal from said relay station, said composite signal containing a copy of said source signal from each said device;

modifying said stored signal at each said device using said compensation parameters to obtain a respective cancellation signal for each said device; and subtracting at each said device said respective cancellation signal from said composite signal to recover a desired signal, said desired signal being the source signal from the other device.

2. The method according to claim 1 wherein each said device transmits on a first common transmit frequency channel and receives on a second common receive frequency channel.

3. The method according to claim 1 wherein each said device transmits and receives in a common transmit time slot.

4. The method according to claim 1 wherein each said device transmits and receives a spread spectrum signal employing a common spreading code.

5. The method according to claim 1 wherein each said device transmits and receives using a common channel assignment of a hybrid multiple access scheme.

6. The method according to claim 1 wherein each said first device and said second device transmits a training sequence during periods where the other one of said respective device is not transmitting to permit rapid analysis of said channel.

7. The method according to claim 1 wherein each said first device and said second device performs analysis of said channel without benefit of a training sequence.

8. In a system for two-way relayed electromagnetic communication between a first device and a second device through a relay station, wherein each said first device and said second device includes a modulator, a transmitter, a receiver and a demodulator, an apparatus at each said first device and said second device for permitting said system to share common communication channels, said apparatus comprising:

means for capturing either a source signal directed to said transmitter from said modulator or a source information signal directed to said modulator;

means for storing a representation of said source signal at said device at which said source signal originates;

means for estimating channel characteristics of a roundtrip path to said relay station to obtain compensation parameters;

means for extracting a composite signal from said receiver, said composite signal containing a copy of said source signal;

means coupled to said estimating means for modifying said stored signal using said compensation parameters to obtain a cancellation signal; and means coupled to said modifying means and to said extracting means for subtracting said cancellation signal from said composite signal to recover a desired signal, said desired signal being the source signal from the other device.

* * * * *